United States Patent Office 3,745,188
Patented July 10, 1973

3,745,188
PREPARATION OF NITROBENZYL ALCOHOL MESYLATES AND TOSYLATES
Edmond M. Bottorff, Indianapolis, Ind., assignor to Eli Lilly and Company, Indianapolis, Ind.
No Drawing. Filed Apr. 19, 1971, Ser. No. 135,479
Int. Cl. C07c 143/68
U.S. Cl. 260—456 R        3 Claims

ABSTRACT OF THE DISCLOSURE

Mesylates and tosylates of o-, m-, and p-nitrobenzyl alcohols are prepared in high yields by reacting the nitrobenzyl alcohol with methanesulfonyl chloride or p-toluenesulfonyl chloride in acetone in the presence of dicyclohexylamine.

BACKGROUND OF THE INVENTION

The nitro-substituted benzyl alcohols are useful chemical intermediates, for example in the preparation of nitrobenzyl esters. As such, they can be employed as carboxylic acid protecting groups. For example, in copending application, Ser. No. 808,313, filed Mar. 18, 1969, and now abandoned, the p-nitrobenzyl ester of penicillin sulfoxides is described.

The preparation of nitrobenzyl esters is generally accomplished by reacting a nitrobenzyl bromide or chloride with the sodium salt of the desired carboxylic acid. This procedure is generally satisfactory but suffers from the disadvantage that the nitrobenzyl halides are potent vesicants which can cause severe irritation to the skin, eyes and mucous membranes of those handling these halides.

The vesicant property of the nitrobenzyl halides present a serious drawback to their use in any large scale commercial process. Accordingly, the availability of other reactive derivatives of the nitrobenzyl alcohols which could employed in commercial processes, for example, in the preparation of nitrobenzyl esters, would provide an alternative to the use of the nitrobenzyl halides.

The methanesulfonate and p-toluenesulfonate esters of the nitro-substituted benzyl alcohols are attractive alternatives to the nitro-substituted benzyl halides. These particular sulfonate ester moieties are reactive and readily displaceable groups which can be employed in the synthesis of nitrobenzyl esters of carboxylic acids.

However, the published methods for preparing the methanesulfonate and p-toluenesulfonate esters of the nitro-substituted benzyl alcohols are unsatisfactory in that they afford such low yields of these esters as to render their use in any commercial process uneconomical.

Therefore the availability of a method for the preparation of the methanesulfonate and p-toluenesulfonate esters of the nitro-substituted benzyl alcohols in commercial quantities would provide a significant alternative to the use of the nitrobenzyl halides in large scale processes.

It is an object of this invention to provide a method for the preparation of the methanesulfonate and p-toluenesulfonate esters of the nitro-substituted benzyl alcohols. A further object of this invention is to provide a method for preparing nitrobenzyl methanesulfonates and p-toluenesulfonates which is amendable to large scale commercial use.

DESCRIPTION OF THE PRIOR ART

The preparation of alkyl and aryl sulfonate esters is carried out by reacting an alkyl or arylsulfonyl halide, commonly the chloride, with the desired alcohol in the presence of a suitable base such as sodium hydroxide or a tertiary amine such as pyridine. Generally, satisfactory yields of sulfonate esters are obtained with this method. For example, the preparation of n-butyl p-toluenesulfonate in 54 percent yield by the reaction of p-toluenesulfonyl chloride with n-butyl alcohol in the presence of sodium hydroxide is reported in Gilman and Blatt, "Organic Syntheses," Coll. vol. I, 2nd ed., New York, John Wiley and Sons, Inc., 1944, p. 145. 1-dodecyl p-toluenesulfonate is prepared in 90 percent yield by reacting p-toluenesulfonyl chloride with dodecyl alcohol in the presence of pyridine, Horning, "Organic Syntheses," Coll. vol. III, New York, Wiley and Sons, Inc., 1955, p. 366.

The attempted preparation of the methanesulfonate and p-toluenesulfonate esters of the nitro-substituted benzyl alcohols by the above described method, however, results in such poor yields as to render the method unattractive for the preparation of these esters in quantities suitable for commercial processes.

SUMMARY OF THE INVENTION

According to the method of this invention, a nitro-substituted benzyl alcohol is reacted with methanesulfonyl chloride or p-toluenesulfonyl chloride in acetone in the presence of dicyclohexylamine to provide, in excellent yield, the nitro-substituted benzyl methanesulfonate or p-toluenesulfonate.

The reaction proceeds rapidly to completion at or near room temperature to provide the sulfonate esters as crystalline products without extensive work-up and purification procedures.

DETAILED DESCRIPTION

The sulfonate esters provided by the method of this invention are represented by the following formula

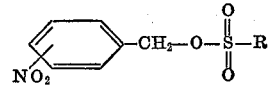

wherein R is methyl or p-tolyl, representing respectively a methanesulfonate ester and a p-toluenesulfonate ester.

Hereinafter the term, mesylate, is used to designate the methanesulfonate ester moiety and mesyl chloride to designate methanesulfonyl chloride. The terms, tosylate and tosyl chloride are employed to designate p-toluenesulfonate and p-toluenesulfonyl chloride respectively.

The method of this invention for preparing the mesylates and tosylates described herein comprises reacting a nitrobenzyl alcohol with mesyl chloride or with tosyl chloride in the presence of dicyclohexylamine. The reaction is carried out in a convenient volume of acetone at a temperature between about 5 and 45° C.; however, it is most conveniently carried out and proceeds best at a temperature between about 15 and 35° C.

The reaction is performed in the following manner. The nitrobenzyl alcohol is dissolved in acetone and the mesyl or tosyl chloride is added to the solution in an amount somewhat in excess of the stoichiometric amount. No reaction appears to occur when the sulfonyl halide is added. The solution is agitated by stirring and a slight molar excess of dicyclohexylamine is added to the solution by dropwise addition, or portionwise. Upon addition of the amine, the mildly exothermic esterification reaction proceeds, and the reaction mixture is cooled in an ice bath as required to maintain the temperature at about 25° C. Shortly after the addition of dicyclohexylamine has been started; a precipitate of dicyclohexylamine hydrochloride begins to form. The reaction mixture is stirred for an additional period of time to insure complete reaction and is then filtered to remove the insoluble precipitate of dicyclohexylamine hydrochloride.

The filtrate is evaporated to remove the acetone solvent, and the residual crude nitrobenzyl tosylate or mesylate is purified by recrystallization. Depending upon the quality of the starting materials, the crude reaction product may require decolorization with activated charcoal prior to crystallization.

Alternatively, following the filtration of the dicyclohexylamine hydrochloride salt from the reaction mixture, the sulfonate ester can be recovered from the filtrate by diluting the filtrate with water. The sulfonate ester precipitates from the diluted filtrate and is filtered and purified by recrysallization.

As previously mentioned, a convenient volume of acetone is employed as the solvent medium in the present invention. A volume of between about 400 to 1,000 ml. per mole of nitrobenzyl alcohol employed is suitable, although the volume is not critical. It is preferable to use a volume of acetone sufficient to provide liquidity to the reaction mixture following the precipitation of dicyclohexylamine hydrochloride. It is preferable to use dry acetone, although minor amounts of water normally present in quality grades of acetone do not significantly affect the yields of product.

In a specific embodiment of the present invention, one mole of p-nitrobenzyl alcohol is dissolved in 500 ml. of dry acetone and 1.1 moles of tosyl chloride are added with stirring. To the stirred mixture are added, by dropwise addition over 30 minutes, 1.2 moles of dicyclohexylamine. The reaction mixture is maintained at a temperature between about 25 and 35° C. by means of an ice-water bath. During the addition of the amine a precipitate of dicyclohexylamine hydrochloride begins to form. When the addition of the amine has been completed, the reaction mixture is stirred for an additional 30 minutes. The dicyclohexylamine hydrochloride precipitate is filtered and the filtrate is evaporated to dryness. The solid residue is crystallized from carbon tetrachloride or chloroform to obtain p-nitrobenzyl tosylate as a crystalline solid.

The following sulfonate esters are illustrative of those prepared according to the method of this invention.

p-nitrobenzyl p-toluenesulfonate
m-nitrobenzyl p-toluenesulfonate
o-nitrobenzyl p-toluenesulfonate
o-nitrobenzyl methanesulfonate
p-nitrobenzyl methanesulfonate
m-nitrobenzyl methanesulfonate Dicyclohexylamine is the preferred amine in the method of this invention. Mesylates of the nitrobenzyl alcohols are obtained in yields greater than 65 percent, while the tosylates are obtained in yields of 80 percent or higher when dicyclohexylamine is employed.

Although pyridine and diisopropylamine can be used in the present method, the yields of mesylates and tosylates obtained when such amines are employed are substantially inferior to those obtained when dicyclohexylamine is employed.

A wide variety of other amines which would be expected to function in the reaction of a tosyl or mesyl halide with a nitrobenzyl alcohol were found either to be inoperative or to provide insignificant yields of the sulfonate ester. The following amines were found to be unsatisfactory for the preparation of the nitrobenzyl tosylates and mesylates: 2,6-lutidine, N,N-dimethylaniline, N,N-diethylaniline, N-methylpyrrolidine, N-methylmorpholine, dimethylbenzylamine, triethylamine, N-ethylaniline, morpholine and di-n-propylamine.

The performance of dicyclohexylamine in the present method appears to be related to the solubility of dicyclohexylamine hydrochloride in the reaction mixtures comprising acetone, nitrobenzyl alcohols and the mesyl or tosyl chlorides. However it is not unlikely that dicyclohexylamine functions other than as a hydrogen chloride acceptor by participating in the reaction in some other more direct fashion.

The nitrobenzyl tosylates and mesylates provided by the present method are useful chemical intermediates in the preparation of nitrobenzyl esters of carboxylic acids. In particular, they can be employed in the preparation of the nitrobenzyl esters of penicillin sulfoxides wherein the nitrobenzyl ester moiety functions as the carboxylic acid protecting group in the rearrangement of the penicillin sulfoxide ester to a cephalosporin antibiotic as described by U.S. Patent 3,275,626. The nitrobenzyl esters are readily removed after the formation of the cephalosporin to provide the cephalosporanic acid.

The nitrobenzyl mesylates and tosylates are reacted with a penicillin sulfoxide acid, for example 6-phenoxyacetamidopenicillanic acid sulfoxide, in acetone in the presence of a suitable unreactive base such as triethylamine to provide the nitrobenzyl ester of the penicillin sulfoxide, for example p-nitrobenzyl 6-phenoxyacetamidopenicillanate sulfoxide.

It will be recognized by those skilled in the art that the mesylates and tosylates provided by the method of this invention can be employed in many other instances as substitutes for nitrobenzyl halides.

This invention is further illustrated by the following examples.

EXAMPLE 1

To a solution of 15 g. (0.10 mole) of p-nitrobenzyl alcohol and 23 g. (0.12 mole) of tosyl chloride in 100 ml. of acetone was added over 10 minutes with stirring 20 g. (0.11 mole) of dicyclohexylamine. The reaction mixture was cooled by means of an ice bath in order to maintain a temperature of about 25 to 35° C. During the addition of the dicyclohexylamine, a precipitate of dicyclohexylamine hydrochloride began to form. The reaction mixture was stirred for an additional 10 minutes while the temperature was maintained at about 25° C. The precipitate was filtered to yield 21 g. of dicyclohexylamine hydrochloride. The filtrate was diluted with 300 ml. of water and the diluted filtrate was stirred for 15 minutes. A heavy precipitate of the reaction product, p-nitrobenzyl tosylate was formed. The reaction product was filtered and air dried to yield 32 g. of the tosylate ester of p-nitrobenzyl alcohol as a somewhat impure product. The reaction product was dissolved in 300 ml. of carbon tetrachloride and the solution was filtered to remove minor insoluble impurities. The filtrate was refrigerated overnight to yield 27 g. (88 percent yield) of the reaction product, p-nitrobenzyl tosylate melting at about 100 to 102° C. A thin layer chromatogram of the reaction product on silica gel showed one spot material.

EXAMPLE 2

To a solution of 76.5 g. (0.5 mole) of m-nitrobenzyl alcohol and 105 g. of tosyl chloride (0.55 mole) in 250 ml. of acetone was added with stirring 90.5 g. of dicyclohexylamine. The addition of the amine was complete in about 20 minutes. The reaction mixture was maintained at a temperature of about 25° C. throughout the addition of the amine. The reaction mixture was stirred for an additional two hours and was then filtered to remove the precipitate of dicyclohexylamine hydrochloride. The precipitate was washed on the filter with acetone and the acetone wash was combined with the filtrate. The filtrate was evaporated to dryness in vacuo and the residue was dissolved in carbon tetrachloride. The carbon tetrachloride solution was chilled in an ice bath to deposit 129 g. of m-nitrobenzyl tosylate melting at about 91 to 95° C. (84 percent yield).

EXAMPLE 3

To a solution of 153 g. (1.0 mole) of o-nitrobenzyl alcohol and 210 g. (1.1 moles) of tosyl chloride in 500 ml. of acetone was added over 20 minutes with stirring 181 g. (1.0 mole) of dicyclohexylamine. Throughout the addition the reaction mixture was maintained at a temperature of about 20 to 25° C. by means of an ice bath. The reaction was allowed to stir for an additional two hours after the addition of the amine was completed. The reaction mixture was then filtered to remove the precipitate of dicyclohexylamine hydrochloride. The precipitate of the amine salt was washed with acetone on the filter and the acetone wash was combined with the filtrate. The filtrate was evaporated to dryness in vacuo and the residue was dissolved in two liters of carbon tetrachloride. The reaction product, o-nitrobenzyl tosylate, formed as a crystalline precipitate when the carbon tetrachloride solution was chilled. The reaction product was filtered to yield 257 g. of product melting at about 100 to 102° C. (84 percent yield).

EXAMPLE 4

In a round bottom, 3-necked flask were placed 15.3 g. (0.1 mole) of p-nitrobenzyl alcohol and 75 ml. of dry acetone. To the solution was added by dropwise addition from a dropping funnel, 11.5 g. (0.1 mole) of methanesulfonyl chloride in 25 ml. of acetone, while from another dropping funnel was added by dropwise addition 18.1 g. (0.1 mole) of dicyclohexylamine in 25 ml. of dry acetone. The two solutions were added over a period of 20 minutes at such a rate that there was always excess sulfonyl halide present in the reaction mixture. The temperature of the reaction mixture was maintained at 30–35° C. by means of an ice water bath. Following the addition of the mesyl chloride and dicyclohexylamine, the reaction mixture was stirred for 2 hours. The heavy precipitate of dicyclohexylamine hydrochloride was filtered and was washed with acetone on the filter. The acetone wash was combined with the filtrate and the filtrate was evaporated to dryness to yield 27.9 g. of a yellow-brown solid. The residue was dissolved in 250 ml. of hot ethanol and 5 g. of carbon was added to the solution. The carbon was filtered and the hot filtrate deposited 14.9 g. of p-nitrobenzyl methanesulfonate melting at about 108.5–110.5° C.

I claim:
1. The method for preparing a compound of the formula

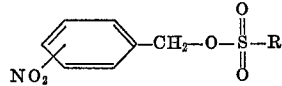

wherein R is methyl or p-tolyl, which comprises (1) reacting a nitrobenzyl alcohol with methanesulfonyl chloride or p-toluenesulfonyl chloride in dry acetone in the presence of at least an equivalent amount of dicyclohexylamine, (2) separating the precipitate of dicyclohexylamine hydrochloride from the reaction mixture and (3) recovering the nitrobenzyl methanesulfonate or the nitrobenzyl p-toluenesulfonate from the reaction mixture.

2. The method of claim 1 wherein p-nitrobenzyl alcohol is reacted with p-toluenesulfonyl chloride to provide p-nitrobenzyl p-toluenesulfonate.

3. The method of claim 1 wherein p-nitrobenzyl alcohol is reacted with methanesulfonyl chloride to provide p-nitrobenzyl methanesulfonate.

References Cited

Kochi et al.: J.A.C.S., vol. 75, 3443–44 (1953).

HOWARD T. MARS, Primary Examiner
L. B. DECRESCENTE, Assistant Examiner

U.S. Cl. X.R.
260—456 P